Sept. 16, 1952
W. WEIR
2,610,730
SCRAPER CONVEYER
Filed July 14, 1950
2 SHEETS—SHEET 1
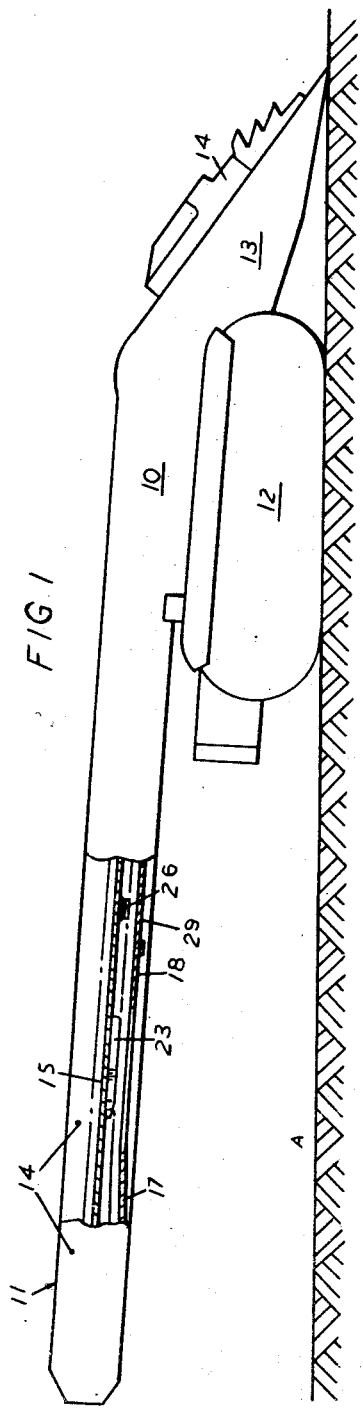
Inventor:
WILLIAM WEIR
By
Richardson, David and Nordon
Attorneys Sept. 16, 1952 W. WEIR 2,610,730
SCRAPER CONVEYER
Filed July 14, 1950 2 SHEETS—SHEET 2
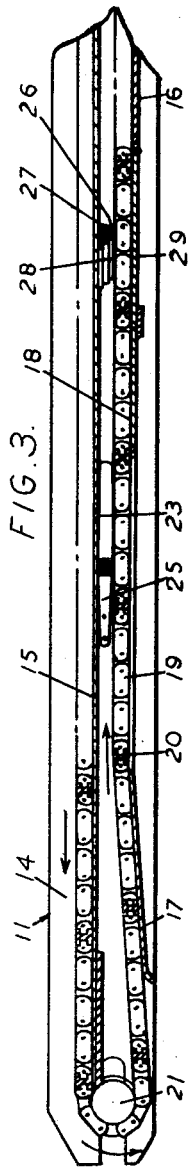
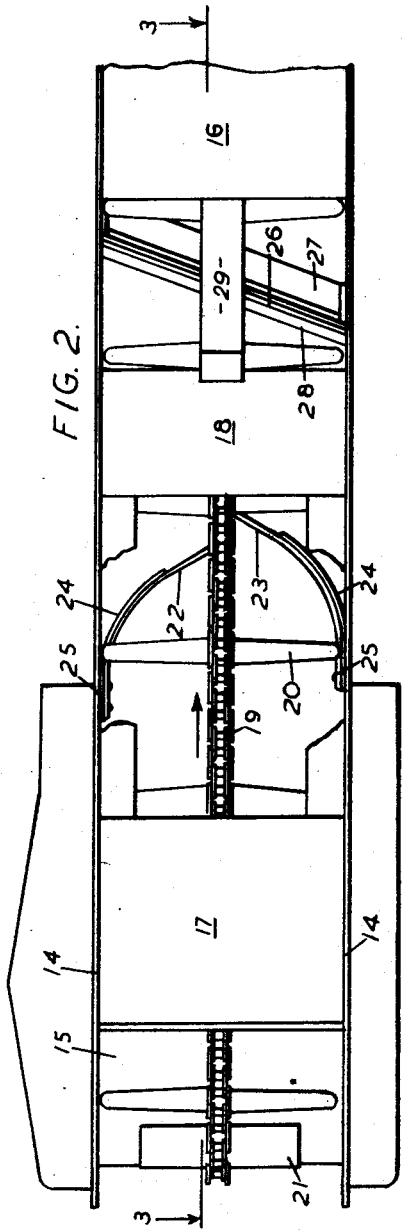
Inventor:
WILLIAM WEIR
By
Richardson, David and Nordon
Attorneys

UNITED STATES PATENT OFFICE

2,610,730

SCRAPER CONVEYER

William Weir, Glasgow, Scotland, assignor to Mavor & Coulson, Limited, Glasgow, Scotland Application July 14, 1950, Serial No. 173,883
In Great Britain December 3, 1948

6 Claims. (Cl. 198—229)

1

This invention relates to scraper-conveyors for the conveyance of coal or other mineral matter; that is to say, conveyors of the type comprising a frame structure including a long channel and a conveyor proper consisting of an endless series of transverse scrapers carried by one or two endless chains driven by one or two sprocket wheels; the scrapers in the upper working run of the conveyor travelling along the channel to convey mineral matter supplied thereto.

The invention is especially although not exclusively applicable to so-called "loaders"; that is to say, mobile machines comprising a gathering head in combination with a scraper conveyor.

Scraper conveyors are subject to the disadvantage that pieces of mineral tend to get jammed in the travelling parts (namely, the scrapers and chain links) which entrain such matter with them into the lower return run of the conveyor. Such entrained matter may lead to stoppages and even breakages.

Therefore, the object of the present invention is to make provision in a scraper conveyor for removing from the return run mineral matter entrained thereby.

The invention is a scraper conveyor comprising a frame structure, an endless series of scrapers arranged lengthwise of said structure to travel in an upper working run and a lower return run and stripping means mounted crosswise on said structure, said means being interposed above said lower return run so as to extend closely to the scrapers and chain and arranged crosswise at an inclination to the chain so as to press laterally and yieldingly against mineral pieces entrained thereby in order to discharge said pieces from the conveyor.

The stripping means may comprise at least one stripper made as a resilient arm which is yieldable under the thrust of mineral pieces entrained with the lower run and engaged by said arm.

Preferably there are two such strippers arranged one after the other and extending respectively from opposite sides of the frame structure to the middle of the lower run.

There may also be provided, beyond the stripping means, a transverse wiper interposed above the lower run of the scrapers between them and the frame structure but arranged to sweep against the lower run of the scrapers.

An example of the invention as applied to a loader will now be described with reference to the accompanying drawings, in which:

Fig. 1 is an elevation, partly in section, of the loader. Fig. 2 is an inverted plan showing from underneath a portion of the loader, being drawn to a larger scale than Fig. 1. Fig. 3 is a section on the line 3—3 of Fig. 2.

In Fig. 1, the loader is drawn in simple outline, machines of this kind being well known. They are used mainly in coal mines, but they are used sometimes in other workings, for instance quarries. The loader has a frame 10 incorporating a rearwardly extending jib 11. The frame 10 is mounted on power-driven means by virtue of which the loader is mobile; in the example the means comprise so-called "crawlers," or endless tracks, 12. At one end, the frame has a gathering head 13, including oscillatory arms 14 for gathering up the coal or other mineral. The loader includes a scraper conveyor, hereinafter described. The gathering head 13 rises from about ground level A at the front end of the machine to the scraper conveyor and transfers to it the gathered-up mineral matter, and the scraper conveyor extends rearwards and discharges the conveyed mineral matter from the rear end of the jib 11 at an appropriate level. The frame-and-jib structure comprises side walls 14 and an intermediate longitudinal plate 15, and the structure also has a main lower plate 16 and spaced auxiliary plates 17, 18 of which the plate 17 is a sloping ramp. Thus it will be seen that the frame-and-jib structure 10, 11 is formed above as an open channel defined by the side walls 14 and the plate 15 underneath for the upper working run of the conveyor and is formed below as a casing enclosed by the side walls 14, the plate 15 on top and the plates 16, 17, 18 underneath for the lower return run of the conveyor. The conveyor proper includes a single endless chain 19, equi-spaced components of which carry transverse scrapers (or "flights" as they are called) 20 extending to opposite sides of the channel and being designed to sweep along the channel in order to convey the mineral matter supplied to it by the gathering head 13. The conveyor chain 19 passes round a roller or sprocket wheel 21 at the rear end of the jib 11, so that the conveyor turns there into the casing below.

The casing enclosed by the walls 14 at both sides, the plate 15 on top and the plates 16, 17, 18 underneath is provided with transverse stripping means applied to the return run of the conveyor. As shown, the transverse stripping means consists of two strippers 22, 23 in the form of resilient arms which are secured to opposite sides of the casing. Each stripper consists of a blade-like arm which is combined with a supporting plate 24, being secured at one end 25 flat against the casing side wall 14 and being curved so as ultimately to extend inwards and forwards to reach about the middle of the casing. The strippers are both arranged between the ceiling of the casing (that is, the underside of the plate 15) and the lower run of the conveyor, coming as close as practicable to the travelling parts 19, 20. The strippers 22 and 23 are longitudinally spaced apart so that one comes into action ahead of the other. The bottom of the casing is formed between the plates 17 and 18 with an opening in the vicinity of the two strippers 22 and 23. The arrangement is such that any piece of mineral entrained by the return run of the scrapers 20 or chain 19 will come against one or other of the two strippers 22 and 23; and the engaged stripper will yield before the piece of mineral until eventually it forces the piece from the conveyor and discharges it through said opening.

As Fig. 2 shows, the yieldable resilient stripping arms 22, 23 are arranged crosswise at an inclination to the chain, the two arms being at opposite inclinations. Supposing that the first arm 22 is encountered by a piece of mineral being entrained by the conveyor chain 19, this arm yieldingly presses the piece in one lateral direction, namely in the direction away from that side of the conveyor where the arm is mounted. Accordingly, if the piece is free to be dislodged in the direction of pressure it is discharged laterally clear of the chain. Supposing however the piece is not dislodged, the arm 22 will bend out of the way without danger of breakage or damage to the conveyor by the obstruction. Thereafter, the piece will be engaged by the second arm 23, which will yieldingly press it in the opposite lateral direction, so that usually the piece will be dislodged this time.

The conveyor also has a transverse wiper 26. This comprises a strip of material such as rubber which is securely supported by a two-part holder 27, 28 extending across the casing from side to side thereof at an inclination. The holder comes against the ceiling of the casing (namely, the under side of plate 15) and is arranged to keep the wiper 26 against the scrapers 20 and chain 19 and to wipe from these travelling parts any small pieces of mineral matter which have pased the strippers 22 and 23. Openings formed between the plates 16 and 18 of the casing and a mid-support 29 (see Fig. 2) in the vicinity of the wiper ensure that any wiped-off matter will fall from the casing.

I claim:

1. A scraper conveyor comprising a frame structure, an endless conveyor chain, and endless series of scrapers each secured to said chain and all arranged to travel with it lengthwise of said structure in an upper working run and a lower return run, and stripping means mounted on said structure, said means consisting of at least one yieldable resilient stripping arm interposed above said lower return run so as to extend closely to the scrapers and chain and arranged crosswise at an inclination to the chain so as to press laterally and yieldingly against mineral pieces entrained thereby in order to discharge said pieces from the conveyor.

2. A scraper conveyor according to claim 1 in which the frame structure includes a walled plate whereon the chain and scrapers travel and in which the yieldable resilient stripping arm is mounted on the underside of said plate so as to come closely between said plate and said chain and scrapers in the lower return run.

3. A scraper conveyor according to claim 2 in which the frame structure also includes lower plating that supports the chain and scrapers travelling in the lower return run and leads them close to the resilient stripping arm and in which said lower plating forms a discharge for the mineral pieces.

4. A scraper conveyor comprising a frame structure, an endless conveyor chain, and endless series of scrapers each secured to said chain and all arranged to travel with it lengthwise of said structure in an upper working run and a lower return run, and a pair of yieldable resilient stripping arms arranged one after the other and extending respectively from opposite sides of said structure at opposite inclinations to the chain, being interposed above said lower return run closely to the scrapers and chain so as to yieldingly press firstly in one lateral direction against mineral pieces entrained thereby and so as to yieldingly press thereafter in the opposite lateral direction against any such pieces still entrained.

5. A scraper conveyor according to claim 4 in which the frame structure includes a walled plate whereon the chain and scrapers travel and in which the yieldable resilient stripping arms are mounted on the underside of said plate so as to come closely between said plate and said chain and scrapers in the lower return run.

6. A scraper conveyor according to claim 5 in which the frame structure also includes lower plating that supports the chain and scrapers travelling in the lower return run and leads them close to the resilient stripping arms and in which said lower plating forms a discharge for the mineral pieces.

WILLIAM WEIR.

REFERENCES CITED

The following references are of record in the file of this patent:

UNITED STATES PATENTS

| Number | Name | Date |
|---|---|---|
| 272,324 | Renwick | Feb. 13, 1883 |
| 1,477,776 | Shedenhelm | Dec. 18, 1923 |
| 1,933,485 | Rund et al. | Oct. 31, 1933 |
| 2,113,941 | Gustafson | Apr. 12, 1938 |